Sept. 19, 1961 HANS-JOACHIM HARLOFF 3,001,087

IMPULSE TIMING CHAINS

Filed Oct. 4, 1957 2 Sheets-Sheet 1

Inventor:
Hans-Joachim Harloff.
By [signature] Atty.

Sept. 19, 1961 HANS-JOACHIM HARLOFF 3,001,087

IMPULSE TIMING CHAINS

Filed Oct. 4, 1957 2 Sheets-Sheet 2

Inventor,
Hans-Joachim Harloff.
By [signature] Att'y.

3,001,087
Patented Sept. 19, 1961

3,001,087

IMPULSE TIMING CHAINS

Hans-Joachim Harloff, Munich, Germany, assignor to Siemens & Halske Aktiengesellschaft Berlin and Munich, a corporation of Germany Filed Oct. 4, 1957, Ser. No. 688,281
10 Claims. (Cl. 307—88.5)

This invention relates to impulse timing chains and is particularly concerned with impulse timing chains employing diode amplifiers.

The various objects and features of the invention will be brought out in the course of the description which will presently be rendered with reference to the accompanying drawings after first briefly discussing certain aspects to be observed in connection with semiconductor junction diodes. In the drawings, FIG. 1 shows an example of a known diode amplifier;

FIGS. 2*a, b, c* are diagrams illustrating impulses to aid in understanding the operation of the diode amplifier shown in FIG. 1;

Electric current flow through a semiconductor junction diode is caused in the border layers between n-semiconductor and p-semiconductor by the movement of electrons and defect electrons (holes). If the current flows in pass direction, more defect electrons will enter into the region neighboring the border layer of the n-semiconductor than would correspond to the normal equilibrium condition or the static condition under the blocking voltage. Within this region, there is effected a socalled carrier injection. These auxiliary defect electrons remain stored for a short interval after disconnection of the pass current, especially in the case of germanium and silicon diodes, which interval may be represented by the mean life of the defect electrons. Due to diffusion and recombination, the density of the defect electrons decreases in time according to exponential law. If a blocking voltage is connected to the diode during this storage interval, a higher current will initially flow than would correspond to the static blocking current. The current thereupon decreases in accordance with the disappearance of the defect electrons in the n-semiconductor layer, thereby causing the blocking resistance to increase. The blocking current also causes an additional recombination of the defect electrons, thereby effecting an additional reduction of the density thereof. The interval during which there is a noticeable current increase, as compared with the static blocking current, is also referred to as relaxation time. This effect is particularly pronounced in the case of junction diodes. If such diodes are used as rectifiers or switching diodes at high frequencies, the carrier injection and storage will be troublesome because the diodes operate as a consequence, as it were, with a certain inertia.

Figure 1:
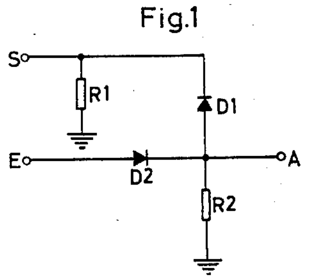

However, attempts have otherwise been made to utilize this effect. National Bureau of Standards, Technical News Bulletin, vol. 38, No. 10, October 1954, describes a method of using a diode with storage effect for building in simple manner an impulse amplifier such as is shown in FIG. 1.

The amplifier comprises a diode D1 with storage effect, a diode D2 without storage effect, which may also be referred to as longitudinal or series diode, a working resistor R2 the resistance of which is high as compared with the pass resistance and low as compared with the blocking resistance of the diode D1, and a resistor R1 having a resistance which is low as compared with that of R2.

Figure 2:
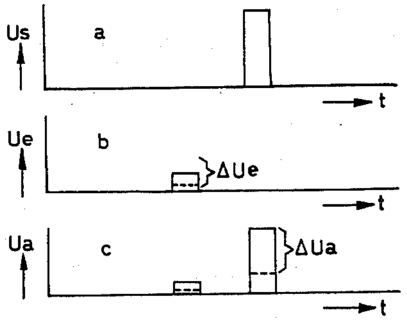

To the control electrode E of the diode amplifier is conducted a control impulse such as shown in FIG. 2. To the feed electrode S of the diode amplifier is conducted an unmodulated feed impulse, which is displaced in time with respect to the control impulse, and the amplitude of which may be almost as high as the blocking pass voltage of the diode D1. The feed impulse belonging to the control impulse shown in FIG. 2*b* is indicated in FIG. 2*a* displaced as to time. The two diodes D1 and D2 are poled so that they are effected by the control impulses in pass direction. As a consequence of such an impulse, current will flow through D2, D1, R1 and a carrier injection can accordingly occur in the n-conducting layer of the diode D1 which reduces the blocking resistance during the relaxation interval. The next following feed impulse will effect this diode in blocking direction. The blocking resistance which is at this moment effective will depend upon the magnitude of the preceding carrier injection, that is, upon the amplitude of the control impulse and upon the time that has meantime expired. There is between the control impulse and the feed impulse a constant displacement as to time and the blocking resistance accordingly depends solely upon the amplitude of the control impulse. The voltage delivered by a feed impulse is distributed along the series circuit of the diode D1 and the working resistor R2. The diode is thereby effected in blocking direction so that its resistance is high against the resistor R2 and therefore does not effect the voltage distribution. The greater the amplitude of the preceding control impulse, the greater the carrier injection and the smaller the effective blocking resistance of diode D1 and the greater the portion of the feed impulse voltage between the output electrode A and ground. The control impulse voltage, control impulse amplitude and output impulse amplitude accordingly change in the identical sense. FIG. 2*c* represents the voltage $U_a$ obtained at the output A. If the amplitudes of the control impulses fluctuate by the amount $\Delta U_e$, the amplitude of the output impulses will in this example vary by the amount $\Delta U_a$. The mean value between start and end of the impulse has been entered as the amplitude. It must be considered in this connection that the carrier density in the blocking layer and therewith the output amplitude decrease for the impulse duration. During the control impulse, there will also appear at the output an impulse with low amplitude which may act as an interference impulse since the control impulse drives a current across the pass resistors of the diodes D2 and D1 and the resistor R1, causing at the last two resistors a corresponding voltage drop. During the feed impulse, there will appear a considerably higher output impulse, which is the amplified impulse with an amplitude that may become almost as high as that of the feed impulse. The diode amplifier accordingly produces an amplification and a shifting in time of the control impulses. The amplification energy is delivered by the feed impulses.

The present invention shows a way for advantageously utilizing, for the construction of timing chains, the above described feature of the diode amplifier to shift control impulses in time. In accordance with the invention, the diode amplifiers are for this purpose circuited in a chain or cascade circuit, over coupling members which serve at the same time as series diodes. The successive diode amplifiers are fed by feed pulses which are of identical pulse sequence frequency but from stage to stage mutually displaced. Accordingly, upon delivery of a control impulse to the first amplifier, such amplifier, upon receipt of a feed impulse, will deliver an output impulse to the next successive coupling member and such member will deliver the impulse as an input impulse to the next successive diode amplifier. This impulse is consequently in similar manner transmitted from stage to stage of the timing chain in synchronism with the feed impulses delivered to the diode amplifiers.

Figure 3:
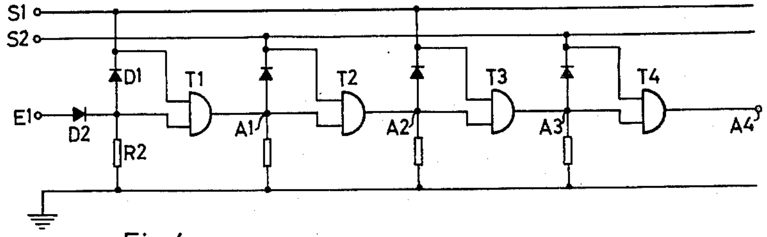
FIGS. 3 and 4 illustrate embodiments of timing chains according to the invention.
Figure 5:
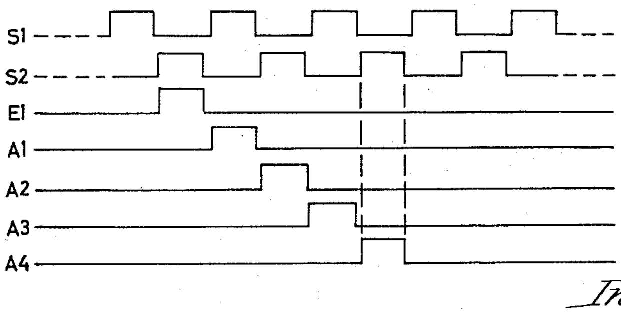
FIG. 5 shows the impulses occurring at certain points in the circuits according to FIGS. 3 and 4.

FIG. 3 shows an embodiment of a timing chain according to the invention. In this embodiment, coincidence circuits are used as coupling members, such members also taking the place of the series diodes (diode D2 in FIG. 1) of the amplifiers. The successive diode amplifiers are alternately connected to two impulse lines or conductors for the pulses S1 and S2 which are mutually displaced by a half cycle. The interior impedances of the pulse generators are to be so low that they do not affect the flow of the current for the carrier injection, which flow is caused by the control impulses. The course of the feed pulses S1 and S2 is represented in FIG. 5. To the input E1 of the first diode amplifier is now conducted a control impulse which must fall into a pause between two feed impulses of one and the same amplifier so that the carrier storage in the storage diode of the amplifier can be utilized in known manner. The control impulse is likewise represented in FIG. 5. During the next following feed impulse for the first amplifier, there will be delivered at the output thereof an impulse for the successive coincidence gate T1 (FIG. 3). The coincidence gate receives at the same time the feed impulse belonging to the first amplifier. The output impulse from the first amplifier opens the coincidence gate and the feed impulse supplied thereto within the same time interval can, accordingly, act as an input impulse for the next successive amplifier. The operations are repeated in the case of the next successive amplifier except that the feed impulses S2 are conducted thereto and to the next successive coincidence gate T2. The output impulses resulting in the successive amplifiers are represented in FIG. 5. Since the input and output impulses of one and the same amplifier are always displaced or shifted by a half cycle, the impulse delivered to the input E1 will be transmitted through the timing chain in synchronism with the rhythm of timing of the feed impulses. The coincidence gates disposed between the amplifiers prevent operative actuation of the respective successive amplifiers by interference pulses occurring at the outputs of the respective amplifiers due to the action of the control impulses.

Figure 4:
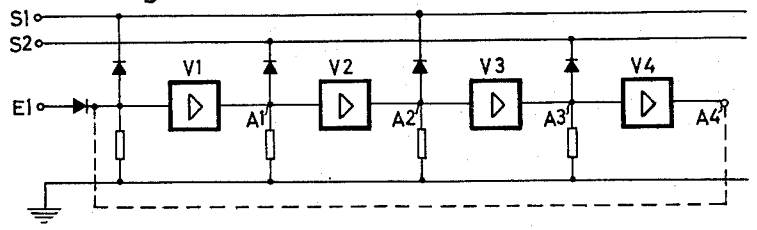

FIG. 4 shows another embodiment of a timing chain according to the invention. In such embodiment, there is connected, between the output and the input of two successive diode amplifiers, an amplifying system having a response threshold such, that it can be operatively affected only by the output impulse but not by the interference pulse of the respectively preceding diode amplifier. The successive diode amplifiers are in this embodiment connected to two pulse lines or conductors for the pulses S1 and S2, which are mutually displaced by a half cycle. The impulse plan shown in FIG. 5 also applies to the operation of the timing chain represented in FIG. 4. To the input E1 of the first diode amplifier of the chain is conducted a control impulse which must fall in a pause between two feed impulses of one and the same diode amplifier. The interference pulse resulting from the control impulse is due to the suitably dimensioned actuating threshold of the amplifier system V1 not amplified thereby and therefore has no effect. Howver, the output impulse delivered from the first diode amplifier during a successive feed impulse S1 is amplified in V1 and acts as input impulse for the second diode amplifier of the chain. The resulting amplification assures a sufficiently strong carrier injection into the storage diode of the second diode amplifier. The operation is repeated between the second and third diode amplifier except that the second diode amplifier receives a feed impulse S2. The feed impulses to the successive diode amplifiers are displaced by a half cycle and the passage of a stored impulse through the chain will accordingly require an interval corresponding to a half cycle. The stored impulse passes through the chain in synchronism with the rhythm of the feed pulses.

Figure 6:
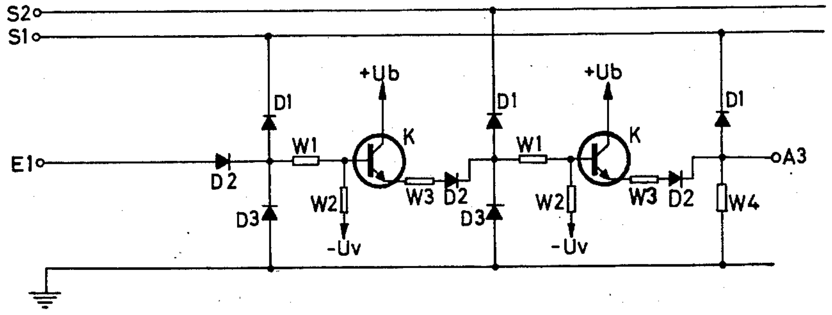
FIG. 6 represents a circuit example of a timing chain.

FIG. 6 shows a circuit example for the above described timing chain employing for the amplifier systems current amplifying n-p-n transistors in collector circuit. The transistors are particularly suitable for realizing the amplifier systems. The base of each transistor which is used for the control contains in normal circuit condition, due to the voltage divider W1—W2 which is connected to the negative voltage source $-Uv$, a negative bias of a magnitude that prevents operative response of the transistor upon delivery of interference impulses. The collector is connected to a positive operating potential $+Ub$. The emitter is connected with the storage diode D1 of the next successive diode amplifier by way of a load resistor W3 and a series diode D2. The load resistor W3 serves for setting the optimum working point of the transistor. The series diode D2 is poled so that it passes from the emitter a current for the carrier injection in the storage diode D1 but no current from the storage diode to the emitter, during a feed impulse. Such current, accordingly, would not flow as a loss over the load resistor of the diode amplifier. The diode D2 also protects the path from emitter to the base of the transistor against impermissibly high voltage load in the blocking direction. The load resistor of the last stage in the chain in the resistor W4; in the preceding stages are the load resistors W1—W2. The total resistance of W1 and W2 must be high as against the blocking resistance of the storage diode with stored carrier so as to provide for a sufficiently high output impulse potential.

The connecting point between the diodes D1 and D2 and the resistor W1 is connected to ground over the diode D3. The latter is poled so that no disturbing negative voltages can appear at the corresponding connecting points while permitting appearance of positive voltages. The arrangement assures presence of near ground potential at the connecting point, in normal circuit condition, independent of the properties of the impulse sources, thus preventing the negative potential $-Uv$ to become effective at the connecting point. The control impulses supplied are, as mentioned, positive. Now, if the connecting point is in normal condition nearly at ground potential, a potential shifting to the positive side will immediately begin upon start of the positive control impulse, and a current will immediately flow over the storage diode which is effective to inject defect electrons. If it were otherwise, the injection would be delayed, resulting in lower carrier injection, which would be disadvantageous. The diode D3, due to the blocking resistance, prevents leakage flow to ground, of noticeable part of the current for the carrier injection conducted by way of the diode D2, which would likewise reduce the carrier injection.

As already explained, the interference pulse occurring coincident with the control impulse does not effect actuation of the transistor because its amplitude is too low. Upon conducting to the respectively preceding diode amplifier the feed impulse, after conclusion of the control impulse, the resulting output impulse will effect actuation of the transistor because it causes a sufficiently great shifting of the base potential to the positive side. The series diode D2 prevents in explained manner loading of the output impulse due to the interior impedance of the respectively preceding impulse source. In the case of the first diode amplifier, the interior impedance is the impedance of the control impulse source, and in the case of the successively following diode amplifiers, it is the emitter blocking impedance of the transistor of the respectively preceding diode amplifier. The control impulse once supplied passes through the chain in the same manner as in case of the chain shown in FIG. 4. Accordingly, the impulse scheme illustrated in FIG. 5 also applies to the circuit shown in FIG. 6.

In the embodiments so far described, the successive stages of the corresponding chains are alternately supplied with feed impulses which are mutually displaced by a half cycle. This, however, represents only one of many possible modes of supplying feed impulses of identical pulse succession frequency to the diode amplifiers.

Figure 7:
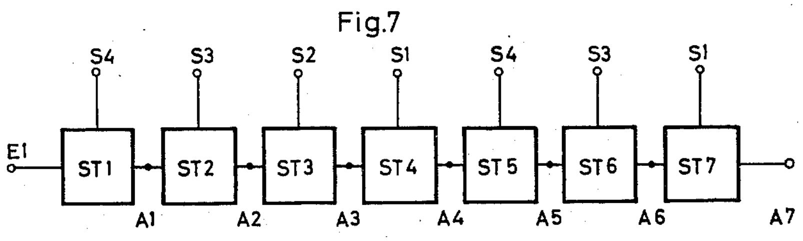
FIG. 7 shows an embodiment for the feed of a plural stage timing chain.

Another mode of feeding the impulses, which, however, can be sensibly applied to the previously explained embodiments, is illustrated in FIG. 7.

Figure 8:
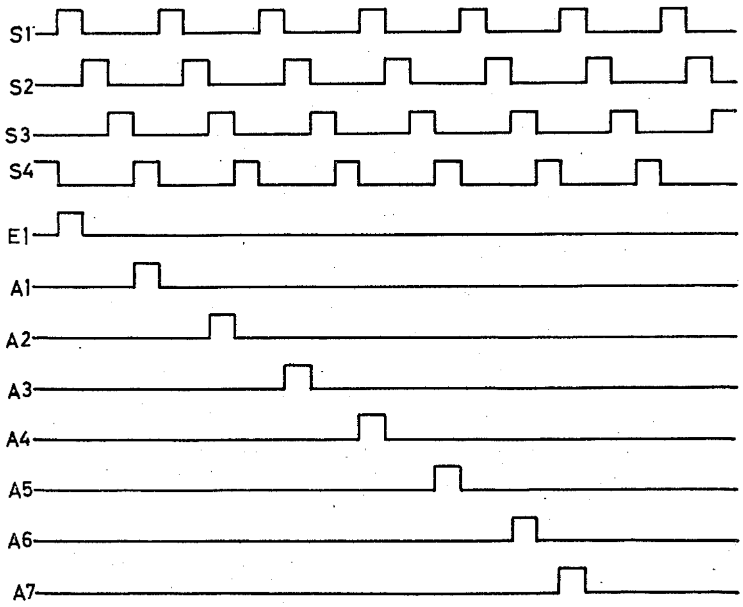
FIG. 8 illustrates the impulse plan or scheme for the timing chain.

In FIG. 7, there are used four feed impulses of identical pulse sequence frequency, having a duration of a quarter cycle and being mutually similarly displaced, so that they provide in common for a full cycle duration. FIG. 8 shows at S1, S2, S3, S4 the impulse scheme for these impulses. It is possible, by suitable selection of the feed impulses conducted to two successive chain stages, to obtain a shifting of a pulse passing through the chain, by a quarter to three quarter cycle, because the shifting corresponds in magnitude to the displacement in time of the two feed impulses. The use of the arrangement is advisable whenever it is desired to obtain great displacement or shifting in time. Each stage may in such case provide for three quarter cycle shifting and the last stage may provide a shifting by a number of quarter cycle intervals so as to obtain the desired total shifting time.

FIG. 7 illustrates an embodiment to effect the above explained operation, showing in simplified representation seven stages of a timing chain. To the input E1 of the first stage S*t*1 may be supplied a control pulse and to the feed electrode of this stage may be supplied a feed pulse S4 whose next following pulse is, in accordance with the scheme of FIG. 8, displaced or shifted relative thereto, by three quarter cycle. The stage S*t*1, accordingly, delivers an output impulse which is shifted by three quarter cycle duration, such output impulse being supplied as input impulse to the next successive stage S*t*2 whose feed electrode is in corresponding manner supplied with a feed impulse S3. At the output A2 of the stage S*t*2 will, accordingly, appear an output impulse which coincides with the feed impulse S3. The impulse scheme FIG. 8 indicates at E1 the control impulse and at A1 and A2, the output impulses from the stages S*t*1 and S*t*2.

The stored impulse is carried through the successive stages S*t*3 to S*t*6 in a similar manner as in the case of the first two stages. It is assumed in the illustrated example, that only a shifting by a half cycle duration will be required to obtain the desired shifting in the last stage S*t*7. The last stage of the chain is controlled by an output impulse which is synchronous with a pulse of the feed impulse S3, and is supplied with a feed impulse S1, so as to produce an output impulse that is as desired shifted with respect to its input impulse. The impulse scheme FIG. 8 also shows at A3 to A7 the output impulses of the stages S*t*3 to S*t*7.

The timing chains shown in FIGS. 3, 4 and 6 may also be employed for effecting a subdivision of the pulse sequence frequency of the feed impulses. For this purpose, as shown in FIG. 4 in dash lines extending between A4 and E1, the output of the fourth amplifier is over a coupling member (in this case the amplifier system V4) connected with the input of the first diode amplifier. An impulse once connected for storage to the input E1 passes repeatedly through the resulting looped chain for, when it is given off by the fourth stage, it will be returned again over the connection extending from A4 to E1 to the first stage of the looped circuit. During the passing of the impulse through the looped circuit, each diode amplifier will be supplied with two feed impulses, as is also apparent from FIG. 5. During this time, an impulse may be taken off at the output of any one diode amplifier. The pulse succession frequency of the impulse taken off is, accordingly, half of the pulse succession frequency of the feed impulse supplied.

Looped circuits of the kind described above may also be longer and differently constructed chains, for example, of the chain shown in FIG. 7. Other subdivisions of the pulse sequence frequency of the feed impulses will then be obtained which may be determined as desired by suitable construction of the corresponding chains. For example, a subdivision to one fifth of the pulse sequence frequency may be effected in case of the chain FIG. 7 provided with a loop circuit for circulating the pulses as described in connection with FIG. 4.

Changes may be made within the scope and spirit of the appended claims in which is defined what is believed to be new and desired to have protected by Letters Patent.

I claim:

1. An impulse timing chain comprising a plurality of diode amplifiers connected in cascade chain circuits in successive stages thereof, coupling members disposed in the series branches of said chain circuit, means for conducting to said diode amplifiers feed impulses which are from stage to stage mutually displaced, means for conducting to the first diode amplifier in the chain a control impulse to produce, responsive to a feed impulse conducted thereto, an output impulse which is directed to the next successive coupling member, said coupling member giving off said output impulse to the next successive diode amplifier as an input impulse therefor, said operation being repeated in the successive stages of said chain circuit, said coupling members being operative to continuously transmit voltage and current fluctuations derived from said feed and output impulses in forward direction, while blocking such fluctuations in rearward direction whereby said first noted output impulse is passed from stage to stage of said chain circuit in synchronism with the feed impulses respectively supplied to said diode amplifiers.

2. A structure and cooperation of parts according to claim 1, comprising a coincidence gate disposed between the input of a diode amplifier and the output of the respectively preceding diode amplifier stage, said coincidence gate constituting a coupling member and comprising two inputs and an output, means for connecting one of said inputs with the output of the preceding diode amplifier stage, means for connecting the other input of said coincidence gate with the feed electrode of the preceding diode amplifier stage, and means for connecting the output of said coincidence gate with the next successive diode amplifier stage.

3. A structure and cooperation of parts according to claim 1, comprising an amplifier system disposed between the output of one diode amplifier stage and the input of another stage, said amplifier system having an actuating threshold providing for operative actuation thereof only in response to the output impulse from the output of the corresponding diode amplifier stage.

4. A structure and cooperation of parts according to claim 3, wherein said amplifier system which is connected between two successively disposed diode amplifiers comprises a current amplifying n-p-n transistor connected in collector circuit, a voltage divider connected between the output of the preceding diode amplifier and a negative potential source, means for connecting the base of said transistor with said voltage divider, and means comprising a resistor in series circuit with a diode for conducting amplified current from the emitter of said transistor to the input of the successive diode amplifier.

5. A structure and cooperation of parts according to claim 4, comprising a diode connected between the output of each except the last diode amplifier and ground, said diode being poled to facilitate in pass direction flow of current produced by said negative potential source and flowing over said voltage divider.

6. A structure and cooperation of parts according to claim 1, comprising loop circuit means for interconnecting predetermined stages of said chain.

7. A structure and cooperation of parts according to claim 2, comprising loop circuit means for interconnecting predetermined stages of said chain.

8. A structure and cooperation of parts according to claim 3, comprising loop circuit means for interconnecting predetermined stages of said chain.

9. A structure and cooperation of parts according to claim 4, comprising loop circuit means for interconnecting predetermined stages of said chain.

10. A structure and cooperation of parts according to claim 5, comprising loop circuit means for interconnecting predetermined stages of said chain.

References Cited in the file of this patent

UNITED STATES PATENTS

| | | |
|---|---|---|
| 2,565,497 | Harling | Aug. 28, 1951 |
| 2,798,983 | Warman | July 9, 1957 |
| 2,801,334 | Clapper | July 30, 1957 |
| 2,808,203 | Geyer et al. | Oct. 1, 1957 |
| 2,842,682 | Clapper | July 8, 1958 |
| 2,848,628 | Aultschul | Aug. 19, 1958 |
| 2,860,259 | Odell et al. | Nov. 11, 1958 |
| 2,869,035 | Beesley | Jan. 13, 1959 |
| 2,906,870 | Huntley et al. | Sept. 29, 1959 |

FOREIGN PATENTS

| | | |
|---|---|---|
| 1,026,360 | Germany | Mar. 20, 1958 |